(12) United States Patent
Umezawa et al.

(10) Patent No.: US 7,963,510 B2
(45) Date of Patent: Jun. 21, 2011

(54) COMPRESSION COIL SPRING DEVICE HAVING A DISCRETE SUPPORT

(75) Inventors: Masahiro Umezawa, Yokohama (JP); Tomotake Kato, Yokohama (JP); Toshio Hamano, Yokohama (JP); Masanao Ueda, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 11/492,345

(22) Filed: Jul. 25, 2006

(65) Prior Publication Data
US 2007/0176340 A1 Aug. 2, 2007

Related U.S. Application Data

(63) Continuation-in-part of application No. 10/496,393, filed as application No. PCT/JP02/12267 on Nov. 25, 2002, now abandoned.

(30) Foreign Application Priority Data

Nov. 27, 2001 (JP) ................................. 2001-361108

(51) Int. Cl.
*F16F 1/06* (2006.01)
(52) U.S. Cl. ........................................ 267/179; 267/178
(58) Field of Classification Search ........... 267/166–180
See application file for complete search history.

(56) References Cited

U.S. PATENT DOCUMENTS

| 1,862,992 | A | * | 6/1932 | Vargha | 267/166 |
| 6,149,171 | A | * | 11/2000 | Bono et al. | 280/124.179 |
| 6,254,071 | B1 | * | 7/2001 | Greenhill | 267/161 |
| 6,308,974 | B1 | * | 10/2001 | Hashirayama et al. | 280/124.162 |
| 6,669,184 | B2 | * | 12/2003 | Leevy et al. | 267/162 |

* cited by examiner

*Primary Examiner* — Melanie Torres Williams
(74) *Attorney, Agent, or Firm* — Marshall & Melhorn, LLC (57) ABSTRACT

A compression coil spring device suitable for use in a strut wheel suspension system. The device includes a coil wire wound into a coil having an end turn. The end turn of the coil, and only the end turn of the coil, is provided with a plurality of projections along the length thereof, with the remainder of the coil wire being substantially free of projections.

12 Claims, 7 Drawing Sheets

COMPRESSION COIL SPRING DEVICE HAVING A DISCRETE SUPPORT

RELATED APPLICATION

The present application is a continuation-in-part of application Ser. No. 10/496,393, filed Nov. 8, 2004 now abandoned, for Compression Coil Spring Device Having A Discrete Support, which is the National Phase entry into the United States of Patent Cooperation Treaty Application Serial No. PCT/JP02/12267, filed Nov. 25, 2002. application Ser. No. 10/496,393 is pending as of the filing date of the present application. U.S. patent application Ser. No. 10/496,393 is hereby incorporated by reference as if set forth in its' entirety herein.

TECHNICAL FIELD

The present invention relates to a compression coil spring device. More particularly, the present invention relates to a compression coil spring device having an open-coil configuration. Most particularly, the present invention to a compression coil spring device having an open-coil configuration which is open at one or both ends and not ground at the open end(s) and which is suitable for use in a strut wheel suspension system for motor vehicles.

BACKGROUND OF THE INVENTION

Helical compression springs or compression coil springs are used in a wide range of applications owing to the favorable spring properties of the springs of this type. A coil end often includes a closely wound (or closed) turn so that the coil end provides a uniform contact surface. Grinding the end surface of a coil spring is also known as a means for providing a uniform contact surface. However, the entire contact surface of the closely wound turn and ground end may not contact an opposing member, such as a spring seat, but instead, they tend to contact the opposing member partially at unpredictable points, which can result in a varying spring property or varying relationship between the load and the compression stroke. Also the closely wound turn and ground end are not effective in producing the spring force. Therefore, in applications where the length of the coil spring is desired to be minimized while providing a maximum spring action, an open end coil spring is sometimes used. The last coil at either end of such a coil spring may be an open or closed turn, and may, or may not be, ground. Such a coil may be referred to as the "end turn".

Now, taking an open and unground end coil as example, contact between a coil end and a spring seat is described in detail hereinafter. Because the coil spring having an open end does not sit on a flat surface in a stable manner, a spring seat having a contoured support surface is sometimes used. In either case, the state of contact inevitably changes as the coil spring is placed under a load and compressed without regard to whether the spring seat is contoured or not. More specifically, when the spring load is light, the contact between the coil wire of the end turn and the spring seat takes place at a point or a short length of the coil wire. However, as the spring load increases the length of contact between the coil wire of the end turn and the spring seat progressively and continually increases along the length of the coil wire. In addition, the contacting region can vary significantly due to different specifics of individual coil springs.

This means that the centroid of the contact pressure between the coil spring and spring seat can vary depending on the spring load. This in turn causes a change in the line of action of the spring force. Also, because the part of the coil wire which is in contact with the spring seat is not capable of any further deflection, and is, therefore, ineffective in increasing the spring force, an increase in the contacting part between the coil wire and the spring seat resulting from an increase in the spring load means a decrease in the number of effective turns of the coil spring. In many applications, such changes in the spring property with the change in the spring load are not desirable.

For instance, in a strut wheel suspension system for motor vehicles, because the point of input of the force which pushes up the tire does not agree with the axial line of the linear hydraulic damper due to the problems associated with the vehicle body structure and the convenience of assembly work, as the tire moves vertically, a certain bending moment is produced in the damper. This bending moment increases the frictional resistance between the damper tube and the piston and between the piston rod and rod guide, and hampers the smooth telescopic motion of the damper. This not only impairs the ride quality but also adversely affects the durability of the sliding parts.

Therefore, in a strut wheel suspension system, it is a common practice to offset the spring force axis of the coil spring from the central axial line of the damper in such a manner that a bending moment is produced in the coil spring that cancels the bending moment acting on the damper as the tire moves vertically. It is therefore important to control the line of action of the spring force under all conditions.

Figure 10:
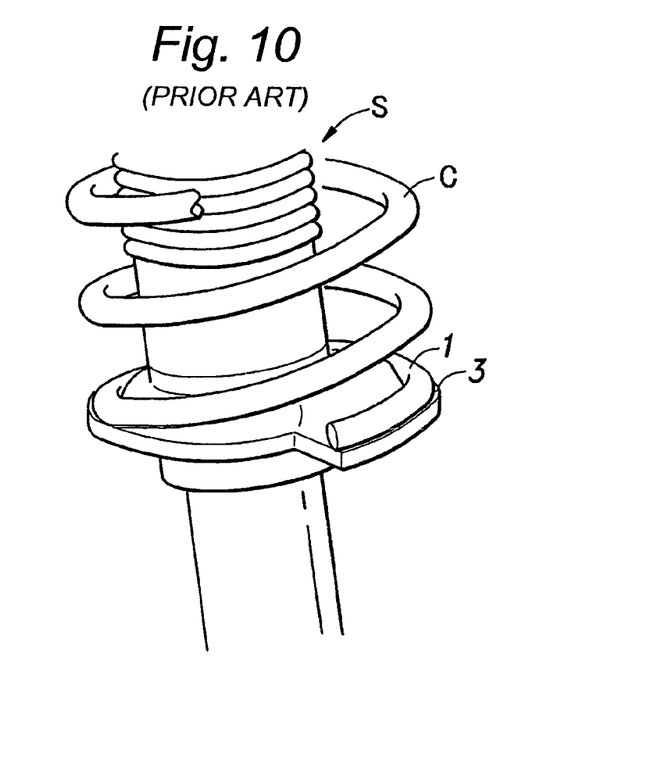
FIG. 10 is a fragmentary perspective view of a prior art strut wheel suspension system utilizing an open coil spring.
Figure 10A:
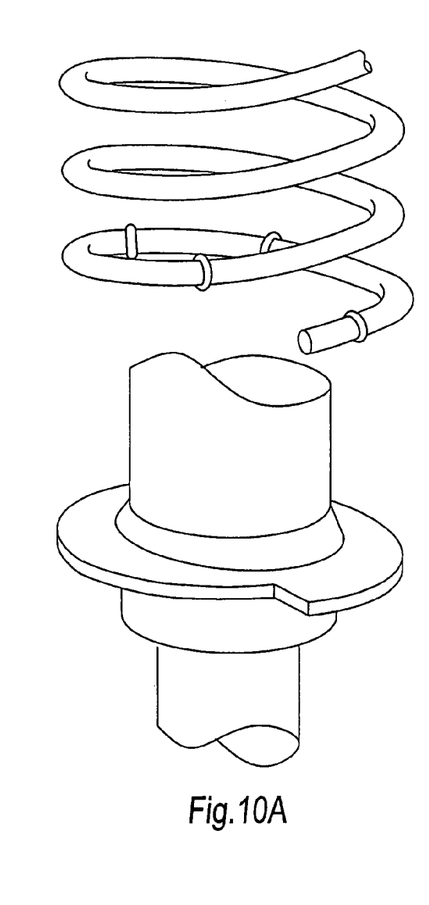
FIG. 10A is a fragmentary perspective view of a strut wheel suspension system similar to that shown in FIG. 10, but utilizing an open coil spring embodying the present invention, which may have projections provided over the entire length of the end turn, with the remainder of the coil wire being free, or substantially free, of projections.
Figure 11A:
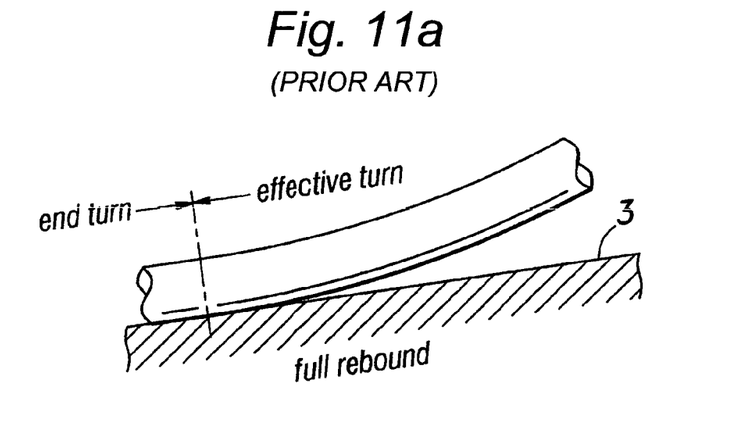
FIGS. 11a to 11c are conceptual diagrams illustrating the problems of the prior art.
Figure 11B:
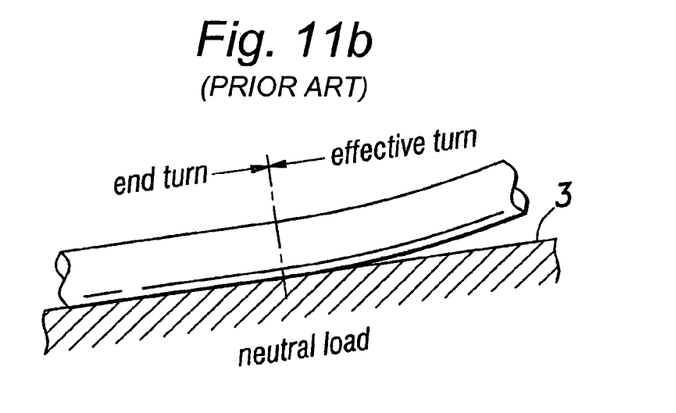
Figure 11C:
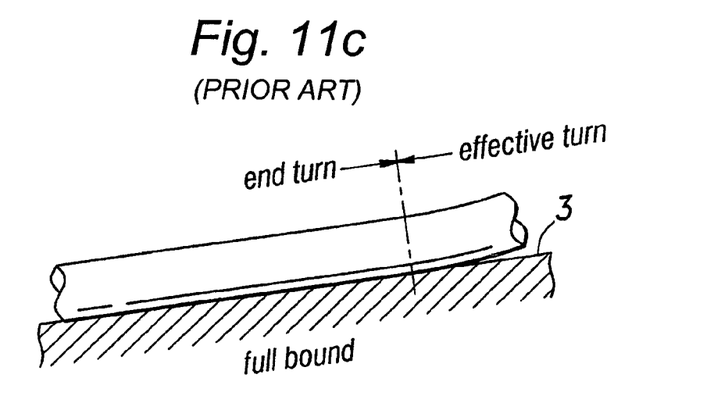

However, when an open-end coil spring C is used in the strut wheel suspension system as shown in FIG. 10, the length of the coil wire at which the end turn 1 of the coil spring C contacts the spring seat 3 progressively increases as the compressive stroke of the coil spring increases as illustrated in FIGS. 11A to 11C, and the number of turns of the coil spring which can deflect, or the number of effective turns of the coil spring, decreases with the increase in the spring load.

Figure 12:
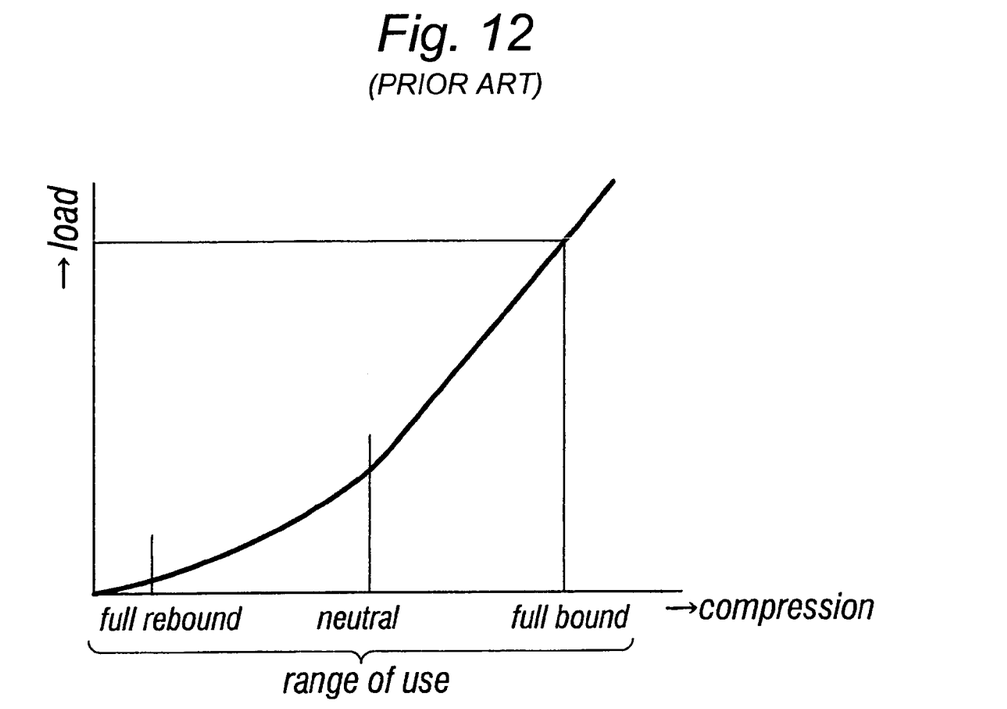
FIG. 12 is a property graph of a conventional coil spring.

The decrease in the number of effective turns increases the spring constant. Therefore, the conventional coil spring demonstrates a nonlinear deflection property as represented by a curve in the graph of FIG. 12, instead of a linear relationship between the load and compressive stroke. In addition, because individual coil springs may have different specifics, the decrease in the number of effective turns may occur in different fashions for different coil springs, leading to varying compression property.

Also, because the centroid of contact pressure between the spring seat and the end turn of the coil spring varies depending on the magnitude of the load, the axis of the spring force changes in angle with the vertical motion of the tire, and the canceling action of the coil spring with respect to the bending moment varies for each individual coil spring. This may result in a coil spring which does not contribute to the action of improving the ride quality.

Furthermore, the spring property of the coil spring is required to be properly tuned so that the wheel suspension system may demonstrate an optimum performance. However, if the spring property varies depending on the spring load or the compression stroke, any exact tuning becomes impossible. The spring may demonstrate an optimum property at a certain load, but does not do so at different load conditions. This is a problem not only for the springs of wheel suspension systems but also for other applications where any tuning of the spring property is required.

BRIEF SUMMARY OF THE INVENTION

In view of such problems of the prior art, a primary object of the present invention is to provide a compression coil spring device which demonstrates a designed spring property without regard to the spring load.

A second object of the present invention is to provide a compression coil spring device having a line of action which remains fixed without regard to the spring load.

A third object of the present invention is to provide a compression coil spring device which demonstrates a fixed spring constant without regard to the spring load.

To achieve such an object, the present invention provides a compression coil spring device including a coil wire wound into an open-coil configuration and having an end turn, wherein the end turn is adapted to be supported by a spring seat at one or a plurality of discrete points. This can be accomplished either by providing a plurality of projections on the coil wire along the length of the coil wire of the end turn only, with the remainder of the coil wire being substantially free from any projections, or by providing a plurality of projections for supporting the end turn at one or a plurality of discrete points of the spring seat.

Thus, the spring demonstrates a same property, with reference to the centroid of contact pressure or line of action of the spring force and the spring constant, without regard to the spring load as long as the spring end is supported by the same discrete contact point or points. In other words, the changes in the number of effective turns depending on the magnitude of the load can be minimized over a certain range so that the relationship between the load and compression stroke can be made substantially linear over this range, and the change in the angle of the axis of the spring force can be minimized. Also, in the above structure, the end turn contacts the spring seat only at the predetermined projections, and this minimizes the variation in the spring property, frictional resistance between the contacting members and bending moment relating to individual coil springs.

For instance, when tuning a wheel suspension system, it is important to tune it optimally under a most common situation such as when the vehicle is cruising on a relatively flat highway. According to the present invention, by properly selecting the positioning of the discrete support points of the end turn of the coil spring in relation with the weight of the vehicle and property of the spring, it is possible to achieve a linear behavior of the coil spring around the neutral operating point of the coil spring as well as to minimize the variation in the property of coil springs associated with respective wheels. By optimally tuning the wheel suspension system with respect to this linear operating range of the coil spring and minimizing the spring property variation, the wheel suspension system may become capable of achieving a highly desirable ride quality.

The projections for achieving the support at discrete contact points can be accomplished in a number of ways. For instance, the end turn may include a wavy part over all, or part of its' length. The end turn may also include a part whose wire diameter varies along a length thereof. The end turn may include a part having a plurality of annular members fitted on the coil wire in a mutually spaced relationship along all or part of the length thereof. The end turn may include all or part thereof having a tubular member fitted on the coil wire, the tubular member being provided with a plurality of external projections disposed in a mutually spaced relationship along a length thereof. The spring seat may be provided with a plurality of projections disposed in a mutually spaced relationship along the length of the coil wire.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
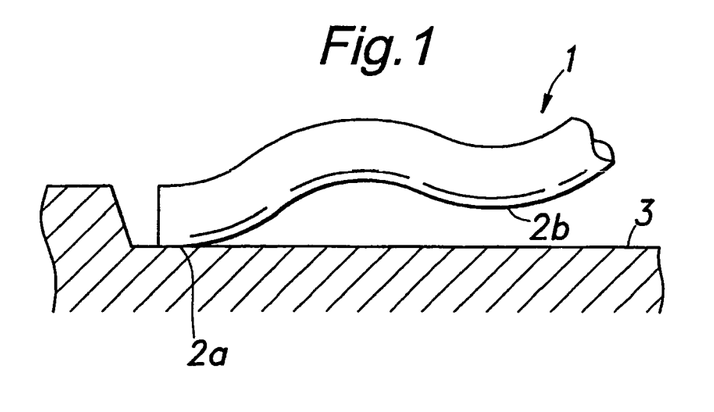
FIG. 1 is a fragmentary developed view of a first embodiment of the coil spring according to the present invention.

FIG. 1 shows an exemplary end turn of a coil spring embodying the present invention. The end turn 1 of this coil spring consists of an open end coil turn, and is provided with a wavy shape as represented by a plurality of bends 2a and 2b. As a result, the contact between the end turn 1 and a spring seat 3 is effected substantially as a point contact, instead of a line contact. According to the prior art, the length of contact between the end turn and the spring seat increased with the increase in the load.

Figure 10B:
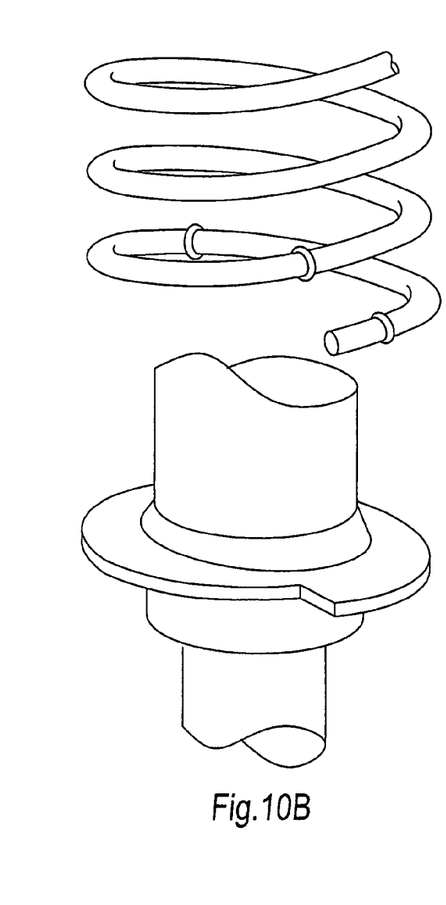
FIG. 10B is a fragmentary perspective view, similar in part to FIG. 10A, but showing an embodiment of the present invention which may have projections provided over approximately three-quarters (0.75) of the length of the end turn, with the remainder of the coil wire being free, or substantially free, of projections.

However, according to the illustrated embodiment, the part of the coil wire located between the two bends 2a and 2b is spaced from the spring seat 3, and thereby remains to be effective as a part of effective turns during the time the load is increased from a value by which only one of the bends 2a is in contact with the spring seat 3 to a value by which the next bend 2b is also brought into contact with the spring seat 3. In other words, because the contact position between the end turn 1 and the spring seat 3 increases only in step-wise fashion, with the contact being made at predetermined positions, the variation in the spring constant due to varying specifics of individual coil springs is controlled, and also, the linearity in the relationship between the load and compression within a prescribed operating range improves. The wavy shape, as well as the other embodiments described below, may be provided over all, or any part of the end turn of the coil spring, on one or both ends, with the remainder of the coil spring being free, or substantially free, of projections. In the preferred embodiment, the projections are provided over three-quarters (0.75) of a full end turn, as shown in FIG. 10B.

Figure 2:
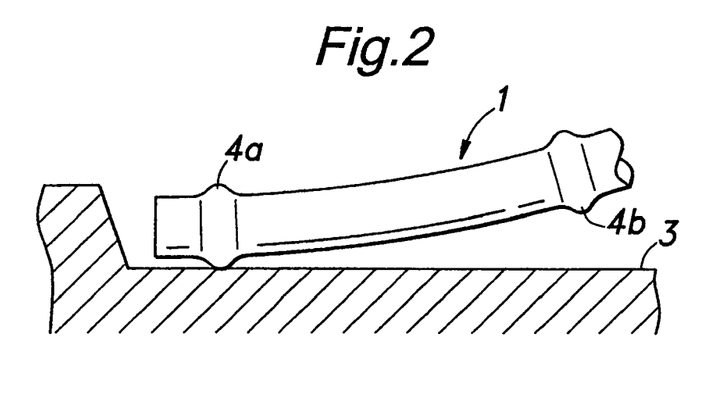
FIG. 2 is a fragmentary developed view of a second embodiment of the coil spring according to the present invention.

The contact between the end turn 1 and a spring seat 3 can be effected at a plurality of points in any one of a number of ways. A plurality of enlarged portions 4a and 4b may be formed in the coil wire of the end turn 1 in a spaced relationship, as illustrated in FIG. 2.

Figure 3:
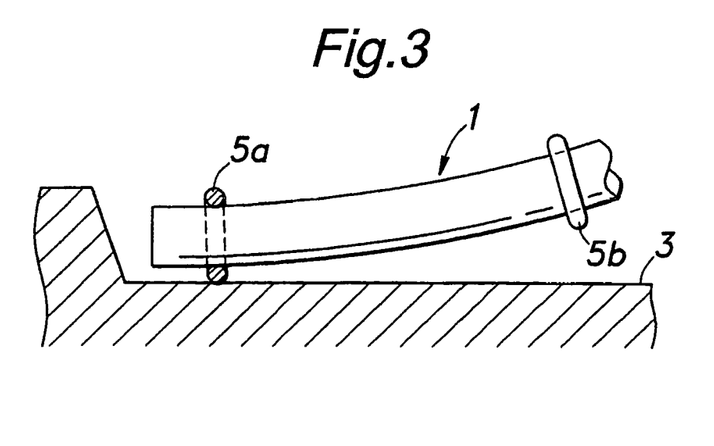
FIG. 3 is a fragmentary developed view of a third embodiment of the coil spring according to the present invention.

A plurality of annular members 5a and 5b may be press fitted or otherwise secured on the coil wire of the end turn 1 in a spaced relationship as illustrated in FIG. 3.

Figure 4:
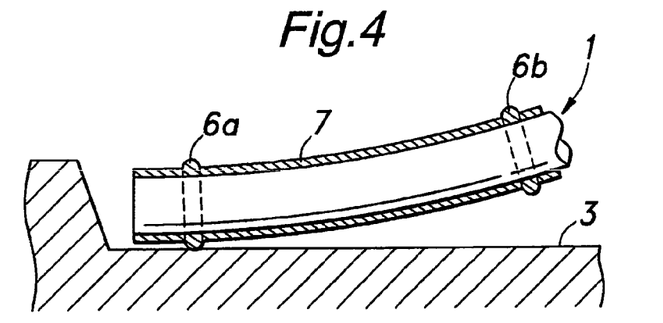
FIG. 4 is a fragmentary developed view of a fourth embodiment of the coil spring according to the present invention.

A tubular member 7 having a plurality of external projections 8a and 8b disposed in a mutually spaced relationship along a length thereof may be fitted on the coil wire of the end turn 1 of the coil wire 3 as illustrated in FIG. 4.

Figure 5:
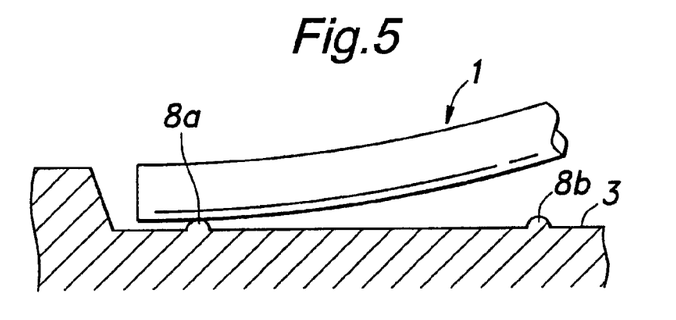
FIG. 5 is a fragmentary developed view of a fifth embodiment of the coil spring according to the present invention.

The part of the spring seat 3 corresponding to the end turn 1 may be provided with a plurality of projections 8a and 8b disposed in a mutually spaced relationship along a circumference of the end turn as illustrated in FIG. 5. When a tubular member 7 is fitted on the coil wire because the load acting on the tubular member is so stable that the tubular member 7 would not be dislodged from the end turn 1.

Figure 6:
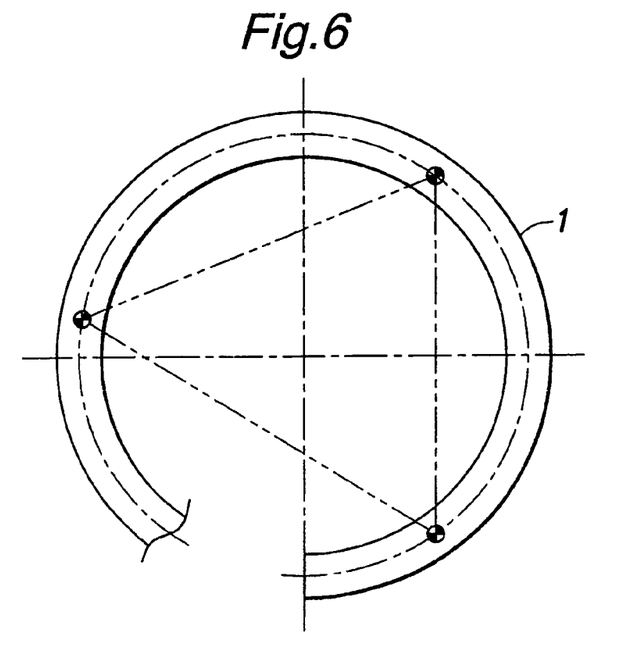
FIG. 6 is a fragmentary plan view of an embodiment of the layout of the contact points.
Figure 7:
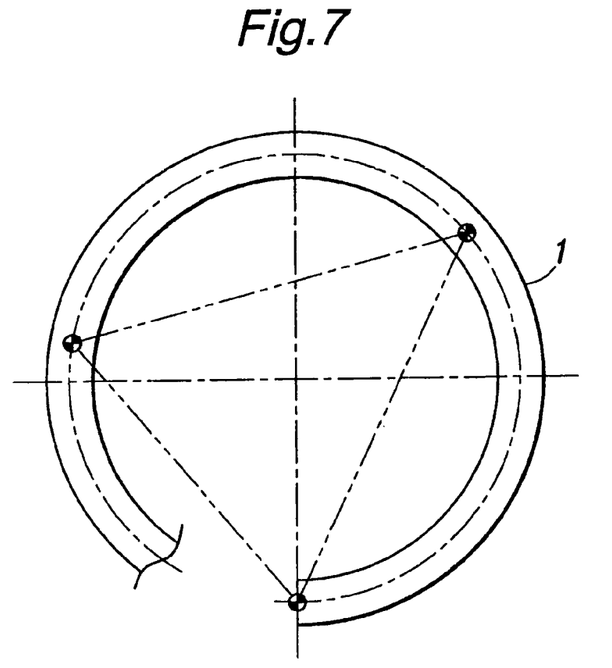
FIG. 7 is a fragmentary plan view of another embodiment of the layout of the contact points.
Figure 8:
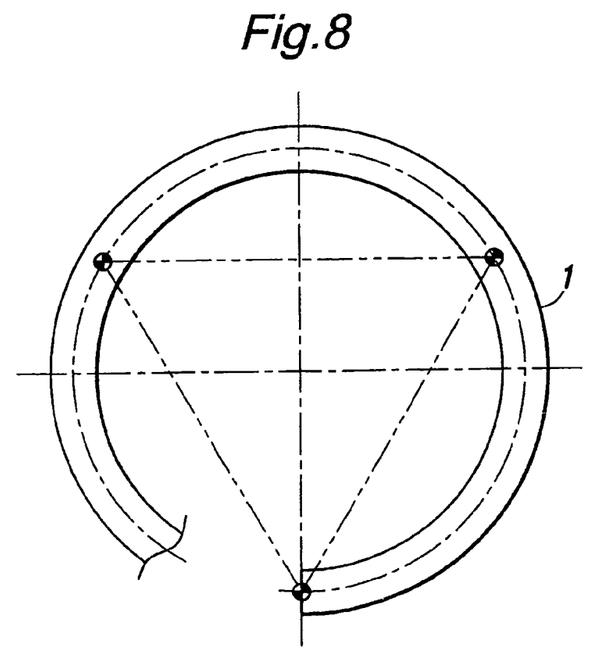
FIG. 8 is a fragmentary plan view of yet another embodiment of the layout of the contact points.

When the projections are placed on the end turn for 0.75 of a full turn, the contact between the end turn 1 and spring seat 3 may be effected at three freely selected points as illustrated in FIG. 6, at three points corresponding to the three vertices of an isosceles triangle as illustrated in FIG. 7, or at three points corresponding to the three vertices of an equilateral triangle as illustrated in FIG. 8. In view of evenly distributing the load, the equilateral triangle arrangement is preferred.

Figure 9:
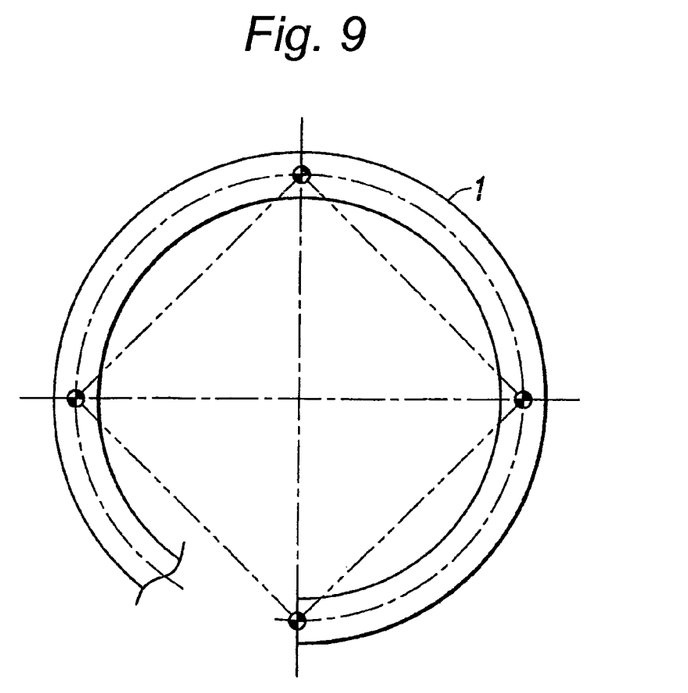
FIG. 9 is a fragmentary plan view of yet another embodiment of the layout of the contact points.

When the projections are placed on the end turn for close to full turn, three contact points may not provide an adequately stable support, so the contact may be effected at four points, which are preferably arranged in a square arrangement as illustrated in FIG. 9.

The applications of the present invention are not limited to coil spring devices for wheel suspension systems of motor vehicles, but may also be used for other spring devices such as valve springs.

Thus, the present invention provides various advantages including those listed hereunder.

1. The linearity of the relationship between the load and compression can be improved.
2. The change in the lateral force can be avoided because the axis of the spring force can be prevented from tilting.
3. The load axis can be identified by analyzing and experimenting the coil spring at a single state because the load axis is substantially unaffected over a certain range by the magnitude of the load.
4. The load of the coil spring acting on the spring seat can be made uniform at will, and the load distribution of the spring seat is well defined. Therefore, the distribution of the strength of the spring seat can be optimized, and this contributes to a light weight design.
5. When the spring device is applied to a strut wheel suspension system, quality control is simplified because the spring property is relatively unaffected by the manufacturing and assembling errors of the end turn and spring seat.

Although the present invention has been described in terms of preferred embodiments thereof, it is obvious to a person skilled in the art that various alterations and modifications are possible without departing from the scope of the present invention which is set forth in the appended claims.

What is claimed is:

1. A compression coil spring device including a coil wire wound into a coil having an end turn, wherein only the end turn of the coil is provided with a plurality of projections along the length thereof, each projection being either formed as part of the end turn of the coil itself or secured to the end turn of the coil at a predetermined point along the length thereof, with the remainder of the coil wire being substantially free of projections, so that said end turn may be supported by a spring seat at one or more mutually spaced, discrete points.

2. A compression coil spring device according to claim 1, wherein said projections are defined by wavy parts of said coil wire.

3. A compression coil spring device according to claim 1, wherein said projections are defined by enlarged parts of said coil wire.

4. A compression coil spring device according to claim 1, wherein said projections are defined by annular members fitted on said coil wire.

5. A compression coil spring device according to claim 1, wherein said projections are defined by projections formed on a tubular member which is fitted on said coil wire.

6. A compression coil spring device according to claim 1, wherein the end turn of the coil is provided with three or four projections along the length thereof so that said end turn may be supported by a spring seat at these discrete points.

7. A compression coil spring device according to claim 6, wherein the end turn is provided with three projections that are arranged at three vertices of an equilateral triangle.

8. A compression coil spring device according to claim 6, wherein the end turn is provided with three projections that are arranged at three vertices of an isosceles triangle.

9. A compression coil spring device according to claim 1, wherein the end turn is provided with four projections that are arranged at four vertices of a square.

10. A compression coil spring device according to claim 1, wherein the compression coil spring consists of a coil spring for a strut wheel suspension system.

11. A compression coil spring device comprising:
a coil spring having an open end turn; and
a spring seat which is provided with a plurality of projections for supporting the end turn of the coil spring such that the end turn of the coil spring is supported at one or more mutually spaced, discrete points as the end turn of the coil spring contacts the spring seat to a progressively increased extent with an increase in spring load.

12. A compression coil spring device according to claim 11, wherein the spring seat is provided with three or four discrete projections along a circumference thereof so that said end turn may be supported by the spring seat at these discrete points.

* * * * *